United States Patent Office 2,899,350
Patented Aug. 11, 1959

2,899,350

PROCESS FOR STORING AND DIGESTING OF FIBROUS AGRICULTURAL RESIDUES

Clarence Birdseye, Gloucester, Mass., assignor, by mesne assignments, to Process Evaluation and Development Corporation, New York, N.Y., a corporation of Delaware No Drawing. Application July 16, 1954
Serial No. 443,959

7 Claims. (Cl. 162—90)

This invention comprises a complete system for the treatment of fibrous plant materials, such as bagasse and straw and other members of the Graminae family, in the manufacture of paper pulp. It provides for prolonged periods of storage of the raw materials under conditions that prevent acid fermentation and at the same time promote chemical digestion during storage. It further provides for reduction of plant stems to small fiberbundles having a very large surface-to-weight area, for the treatment of the fractionated fiber-bundles with a digestant solution at atmospheric pressure, for the uniquely rapid cooking of the impregnated fiberbundles at elevated steam pressures and temperatures not heretofore considered permissible in cooking the delicate fibers of bagasse, and for the subsequent partial refining of such cooked fibers while still at super-atmospheric pressure and at temperatures higher than 100° C. The invention includes, also, improved procedure for separating the pith from the long schlerenchymatous and fibrovascular fibers of the raw material.

Many fibrous agriculture residues, such as sugarcane bagasse, cereal grain straws, flax straws, pineapple leaves, and legume and cotton vines, have long been recognized as potential sources of pulps suitable for various grades of paper, box- and insulating-boards and numerous other related products. In all but a few areas of the earth, however, the plants from which such agricultural residues are obtained are harvested over only relatively short portions of the year, while for economic reasons mills converting them must be operated practically continuously throughout the year. Therefore the raw fibrous residues must usually be stored for periods ranging up to twelve months.

Up to the present time agricultural residues such as the above have commonly been baled before storage. But since the baled materials contain considerable amounts of such fermentable materials as sucrose, pentosans, cellulose, waxes, starches and proteins, the materials are acted upon by many living organisms during storage, usually with results harmful to both the yield and quality of pulps subsequently made from them. I have determined that among the most harmful of such organisms are the bacteria and yeasts causing acid fermentation. Moreover, multiplication of organisms, and consequent damage to the material, are greatest when the store material is wet.

Among the purposes of the present invention is the provision of a process whereby even very wet agricultural residues and other fibrous plant materials may be so pre-treated and stored under atmospheric conditions that they will be simultaneously both protected from damage by acid fermentation organisms and digested to any desired extent during storage by the chemicals used in the pre-treatment.

The process of this invention is based on my discovery that if bagasse or other agricultural fibrous materials, which when fresh have a neutral or acid reaction, are wetted or impregnated with sufficient of any basic solution, such as one containing NaOH, to assure an alkaline reaction in the fibrous material immediately upon treatment and throughout the storage period, harmful multiplication of acid fermentation organisms will be prevented and some of the natural cell-bonding substances, such as lignin and hexosans, will be dissolved.

The treated fibrous material may be stored in any desired manner, as, for instance, in bales or bulk piles. But at no time during the storage period must the pH of the material fall as low as 7.0.

The alkaline solution when applied to the fibrous material may be of any desired composition and temperature, and may be applied in any desired manner. It is important, however, that at the time the fibrous material enters into storage its pH be above 8.0, its active alkali content, as $Na_2O$, be at least 1% and its moisture content be between 25 and 80 percent of its own dry weight. For if the initial pH is less than 8.0 the material may become acid in reaction during storage, thus permitting the rampant multiplication of yeast or other acid fermentation organisms.

Moisture content at the time the material enters storage is also important, for if it is less than 25% the material may become too dry to permit the desired degree of digestion during storage; if it exceeds 70% fluid may be expressed during baling; and if it exceeds 80% liquor will drain from the material when it is bulk-piled. Therefore a moisture content of between 25% and 80%, based on the dry weight of the fibrous material, is desirable at the time storage commences.

Digestive reaction between the non-cellulosic portions of the fibrous material and the chemicals in the pre-treatment solution commences substantially immediately after the material is wetted by the solution, and continues to some extent throughout the storage period. But the rate of digestion slows as the chemical reacts with the material, and becomes negligible when the amount of active alkali, as $Na_2O$, becomes less than about .5 percent of the dry weight of the material treated. Thus material treated by the process of this invention may be stored, without over digestion, for many months after its active alkali content, as NaOH, has decreased to the said .5 percent, at which point the pH of the material will still be above 9.0.

The greater the concentration of active chemical in the material at the time it enters storage, and the higher the storage temperature, the more rapid and extensive the digestive action will be.

Since it is an objective of my present invention to prevent, from the very beginning of the storage period, the multiplication of yeast cells and other acid-ferment-causing microorganisms during the entire storage period, I prefer to sterilize the material by heating it to at least 80° C. prior to storage; and, when storage is to be in a very warm and humid climate, I also prefer to add an alkaline poisonous substance—such as borax—to the treating solution. Nevertheless, in relatively cool areas such as the coastal section of northern Peru, I have obtained satisfactory results by means of pretreatment at room temperature and without the addition of any substance more poisonous than caustic soda, which effectively inhibits multiplication of fermentative micro-organisms requiring an acid medium.

I have further discovered that pretreatment of fibrous material with a hot aqueous solution of heat-resistant carbohydrate-digesting or protein-digesting enzymes—or a combination thereof—prior to contacting the said fibrous material with the basic solution, conditions the material for more rapid and thorough digestion during subsequent storage. For this purpose I prefer to employ enzymes which are stable at 68° to 75° C., and to use the enzymes in a solution having a temperature such as to cause maximum effectiveness of the enzymes employed. The concentration of enzymes in the treating solution may be between 0.1 and 5.0 percent, based on the weight of the solution, and depending upon the speed and extent of enzyme action desired. A beneficial physical washing of the fibrous material, with consequent removal of undesired dirt and other fines, may be brought about by submerging the bagasse in the enzyme solution and violently agitating the solution throughout the period of treatment, which should usually be from five to thirty minutes. Between treatments with the enzyme and basic solutions the fibrous material should be acted upon to reduce its moisture content preferably to less than 60%. The enzyme solution so removed may be reused for treating additional fiber. Pulp produced from enzyme-treated fibrous material will be cleaner and softer, and will require the subsequent use of less digestive and bleaching chemicals, than if said treatment is omitted.

Because of the importance of bagasse in the papermaking industry I shall use that product as the basis for the following description of my present invention; but it should be understood that the invention includes within its scope the treatment of other fibrous agricultural residues and bamboo, palm fiber, and any other fibrous materials which are to be stored for long periods and which are subject to acid fermentation during storage.

In Louisiana sugarcane is usually harvested during only three and one-half months each year, in Florida during six and one-half months, and in Cuba during less than five months. In only 2 countries, Peru and Kenya Colony, is cane crushed during as much as 10 months annually. Therefore, if bagasse is to be pulped economically in any part of the world, part of the crop must be stored for long periods to provide raw material for pulp-making during the months when sugarcane is not crushed. Storage is at present usually accomplished by baling the fresh untreated bagasse and stacking the bales so that air may have free access to the interior of the piles, thus removing some of the large amount of heat resulting from the rampant growth of fermentation organisms within the bales.

Bagasse as it leaves the sugar mill has a moisture content of approximately 47% to 50% and contains about 3% sucrose, much protein, and other substances that serve as food for such diverse organisms as bacteria, yeasts, fungi, molds and termites. Its reaction when freshly crushed is acid, usually between pH 5.5 and 6.5. Thus, beginning immediately after the bagasse is baled or bulk-piled, yeasts and other acid fermentation microorganisms multiply rampantly, causing a rapid rise in temperature, a drop in pH, and various deteriorative changes in the bagasse. The process of the present invention not only effectively controls the acid fermentation organisms, which cannot thrive under alkaline conditions, but by virtue of the high pH of the product also restricts the activities of termites and most molds and fungi. Moreover, the combination of moisture and a basic chemical in the stored fiber greatly lessens the danger of spontaneous combustion.

Whole bagasse, direct from a sugar mill and having a moisture content of 47.9%, was commercially compressed into bales 13" x 13" x 26" and weighing approximately 130 lbs. each. About 4 minutes elapsed between the time the bagasse left the last crushing rolls and the exit of the bales from the press. Bales were stored separately on a concrete floor, in an average ambient temperature of 20° C. Temperatures and samples were taken from bale centers.

| Storage Time | Temperature, degrees | pH |
| --- | --- | --- |
| Immediately after baling | 22.0 | 6.10 |
| 4 hours after baling | 22.8 | 5.80 |
| 7 hours after baling | 22.9 | 5.50 |
| 10 hours after baling | 23.1 | 5.00 |
| 14 hours after baling | 23.3 | 4.60 |
| 18 hours after baling | 24.0 | 4.30 |
| 24 hours after baling | 28.9 | 4.15 |
| 40 hours after baling | 39.0 | 4.12 |
| 2 days after baling | 36.8 | 4.10 |
| 4 days after baling | 33.9 | 4.00 |
| 3 months after baling | ambient | 4.3 |

(In closely packed bales and bulk piles temperature rise is much faster, and reaches a considerably higher point than that shown above.)

The alkaline digestive solution may be applied in any desired way to the bagasse, either immediately after the latter leaves the crushing rolls or after it has been partially dried or treated otherwise in any desired manner.

I shall now describe several specific applications of my process.

*Example 1.*—Pre-treatment with relatively concentrated re-circulated excess caustic soda solution to provide sufficient digestion, during relatively short storage periods, to eliminate the necessity of further cooking before refining. In carrying out my process for this purpose I employ the following steps:

Bagassee direct from a sugar mill is run continuously through a shredder or hammermill to break up the large fiber bundles and to loosen the pith therefrom; the shredded bagasse is passed over a vibrating screen to remove loosened pith and fines to the extent of about 50% of the original bagasse; the accepted fiber, containing about 17% pith, is passed for 20 seconds through a trough of continuously re-circulated caustic solution containing about 20 grams of NaOH, as $Na_2O$, per liter, the solution being maintained at a temperature of approximately 80° C.; excess liquor is drained from the treated bagasse, which is then passed through a steam heated screw-press to reduce the moisture content of the bagasse fiber bundles to about 60% and to complete the sterilization of the bagasse; the pressed material is baled and stored in compact piles at atmospheric temperature for four to six months; the bales are taken from storage and broken up by any commercial bale-breaker, and the resulting fiber-mass is diluted with water to a liquid-solids ratio of 4:1 (i.e. a "consistency" of 20%); the aqueous suspension is then passed through a disc refiner (e.g. Bauer) so adjusted that the resultant pulp will contain about 3% shives; and the pulp is then further refined, after which it may be run on any suitable paper machine to produce a high grade light-brown wrapping paper.

When the above processing procedure is employed the shredded bagasse is sterile and thoroughly impregnated with the caustic solution when it leaves the press; about 8.5% of NaOH, based on the dry weight of the impregnated fiber, will have reacted with the fiber during impregnation and pressing; the fiber when baled will contain about 3.7% of its original dry weight of unreacted active NaOH as $Na_2O$; and this percentage of active NaOH will decline to 1.5 after 3 months of storage at an average atmospheric temperature of 23° C. Approximately 20% of the original dry weight of the fiber will have been dissolved in the caustic solution during impregnation; and the pH of the treated fiber will be 10.8 after impregnation, and 10.4 after 3 months' storage. Storage beyond 3 months will not be desirable, since the considerable amount of active NaOH remaining in the bagasse would cause digestion to continue actively and weaken the fiber.

The impregnated and pressed bagasse of the above example will not only be sterile if bulk-piled while still hot, but will remain substantially sterile—except within about 12 inches of the pile surface—throughout the storage period. Moreover, oxidative exothermic chemical reactions will commence immediately after piling and will raise the bulk of the pile to in excess of 72° C. in from 2 to 4 days. Thereafter, as free oxygen in the pile is exhausted, temperature within the pile will drop slowly, reaching about 43° to 45° C. within one month and remaining at about 38° during the remainder of a 3 months' storage period.

*Example 2.*—Bagasse treated with a relatively small quantity of unrecirculated alkaline digestant liquor, stored for periods up to 12 months and subsequently cooked with added chemical at superatmospheric pressure and a temperature above 100° C. In carrying out my process in this manner I proceed as follows:

Fresh bagasse, containing 45 to 50 percent moisture and preferably shredded and screened to remove some of its pith content, is run continuously through a mixing device, preferably of the ribbon-and-paddle conveyor type, and therein mixed with sufficient unheated caustic soda solution to bring its moisture content to 70% and its active NaOH content to 6% of its dry weight. During this mixing process some of the NaOH will react with the bagasse to dissolve some of its lignin and hexosans and to break down its sucrose. The bagasse will not, however, be sterilized as in Example 1.

Immediately after treatment in the mixer the bagasse is conveyed into a bulk pile, which may be of any desired size and dimensions, and left there until required for further treatment. Digestion will continue actively in the pile until the unreacted active NaOH, as $Na_2O$, has decreased to less than .5% of the dry weight of the fiber originally treated, after which digestion will be negligible although the active NaOH, as $Na_2O$, may eventually drop to below .25%.

Inasmuch as most yeasts and other fermentative microorganisms cannot proliferate actively in alkaline media there will be little fermentation in the piled bagasse, which will have a pH of about 11.0 immediately after treatment with the caustic digestant and above 9 even after 12 months of storage, when its active NaOH, as $Na_2O$, content will have decreased to .5% or less.

But under the above circumstances digestion of the bagasse will not have proceeded sufficiently during storage to permit its manufacture, without further cooking, into pulp suitable for strong wrapping papers, or for bleaching. Therefore, to make a bleachable pulp having a permanganate number of about 19, I add to the fibrous material after storage enough concentrated standard kraft solution (NaOH plus $Na_2S$) to bring the moisture content of the material up to 70% and the total amount of chemical added, as $Na_2O$, to 12% of its original dry weight. I then pass the treated fibrous material through a screw feeder into a continuous cooker, where it is subjected to a steam pressure of 150 p.s.i. and a temperature of about 185° C. for 5 minutes. It is then discharged explosively from the cooker through a suitable valve.

As the treated bagasse passes through the screw feeder into the cooker it is subjected to great pressure and considerable fractionating abrasive action, and its moisture content is reduced to about 50 to 55 percent. This violent pressing aids in distributing moisture and chemical evenly through the fiber mass, and thus makes for uniform cooking.

Chemical solution removed from the bagasse in the screw feeder is preferably pumped into the receiving end of the continuous cooker, where it is quickly re-mixed with the pressed material from the feeder.

*Example 3.*—Flax straw, field-dried and baled, is treated as follows:

As soon as practicable after the bales have been brought to the processing plant they are broken apart and the straw is cut into approximately one-inch lengths, and shredded and screened, impregnated or treated with an alkaline digestant solution as in Examples 1 or 2 above, rebaled, stored at about 40° C. for not less than one month or as long as may be desired, removed from storage, washed to remove dirt, chemicals and dissolved fractions of the straw, pressed, re-treated with a suitable chemical solution (e.g. 12% of its own original weight of NaOH, as $Na_2O$), cooked in a continuous digester for 5 minutes at 150 p.s.i. (about 185° C.), explosively discharged from the digester, and refined and treated further in any desired way.

*Example 4.*—Bamboo canes, preferably mature and more than 2″ in diameter at the base, are first crushed, partially dewatered and cut into approximately 3-inch lengths by running them through sets of rolls, properly grooved. The crushed pieces of cane are then shredded to split the fiber bundles into narrow, easily-penetrable shreds and screened to remove non-organic matter and other fines.

The screened fibrous material is then impregnated—as in Example 1—with a recirculated alkaline solution containing about 5 grams per liter of active NaOH, as $Na_2O$. The impreganted fibers are pressed to reduce their moisture content to about 65%, baled, and stored as long as necessary. After removal from storage the bales are broken, impregnated with a kraft solution as in Example 2, and cooked in a continuous cooker for 7.5 minutes at 150 p.s.i. and at 185° C. After discharge from the cooker the pulp is passed through a disc refiner and subsequently treated in any desired manner.

This application is a continuation-in-part of my co-pending application, Serial No. 336,190, filed February 10, 1953.

Having thus disclosed my invention and described in detail illustrative examples of its practices, I claim as new and desire to secure by Letters Patent:

1. A process for storing and simultaneously digesting fibrous material of the Graminae family for subsequent manufacture into paper pulp, comprising the steps of evenly and thoroughly impregnating the raw material with an alkaline digestant in sufficient quantity to raise the pH of the material above 8.0 so that it will not become acid in storage, adjusting the moisture content to 25–80% based on the dry weight of the fibrous material, storing the impregnated material in bulk for a period in excess of 30 days while maintaining it below cooking temperature, and removing the material from storage before its pH has fallen to 7.0 and after approximately 20% of the original dry weight of the fiber has been dissolved by the alkaline digestant.

2. The process of claim 1 characterized by the further steps of adding a bleaching solution to the fibrous material after it has been removed from storage and thereby further digesting its lignin and hexosan components.

3. The process of claim 1 characterized by the further step of sterilizing the fibrous material before storage by heating it to at least 80° C.

4. The process of claim 1 characterized by the further step of treating the fibrous material with protein-digesting enzyme at 68–75° C. and thereby expediting digestion of the material during subsequent storage.

5. The process of claim 1 characterized by the further step of contacting the fibrous material with a basic solution poisonous to yeast cells before storage, thereby preventing the formation of micro-organisms from the very beginning of the storage period.

6. The process of storing and simultaneously digesting bagasse, comprising the steps of uniformly impregnating bagasse as it leaves the sugar mill with an aqueous solution having an active alkalinity of 2 to 60 grams per liter (as $Na_2O$) and a temperature of approximately 80° C., pressing excess digestant solution from the bagasse to reduce its moisture content to 40–80% by weight, storing the impregnated bagasse in bulk with an initial pH above 8.0 so that it will not become acid in storage, and maintaining it in storage while its pH remains above 7.0 and always below cooking temperature.

7. The process of preparing bagasse for conversion to paper pulp, which comprises the steps of shredding bagasse as it comes from the sugar mill, evenly and thoroughly impregnating the shredded bagasse with an aqueous caustic solution and raising its pH above 10.0, adjusting its moisture content to 25–80% based on the dry weight of the bagasse, storing the impregnated and shredded bagasse until its pH has dropped below 9.0 but not below 7.0 and approximately 20% of the original dry weight of the bagasse has been dissolved by action of the caustic solution during storage, all without permitting the bagasse to become acid, and meanwhile maintaining the bagasse always below cooking temperature.

References Cited in the file of this patent

UNITED STATES PATENTS

| | | |
|---|---|---|
| 1,769,811 | Wells | July 1, 1930 |
| 1,859,848 | Rue | May 24, 1932 |
| 1,880,044 | Richter | Sept. 27, 1932 |
| 1,973,637 | Lathrop et al. | Sept. 11, 1934 |
| 2,061,205 | Olsen | Nov. 17, 1936 |
| 2,186,487 | Joachim | Jan. 9, 1940 |
| 2,280,307 | Diehm | Apr. 21, 1942 |
| 2,295,213 | Joachim | Sept. 8, 1942 |
| 2,566,130 | Karlson et al. | Aug. 28, 1951 |

FOREIGN PATENTS

| | | |
|---|---|---|
| 343,115 | Great Britain | Feb. 16, 1931 |

OTHER REFERENCES

Industrial and Engineering Chemistry, vol. 26, pages 594–598, 1934.